United States Patent [19]

Raddi et al.

[11] 3,769,965
[45] Nov. 6, 1973

[54] MONITOR APPARATUS FOR IMPLANTED PULSE GENERATOR

[75] Inventors: William J. Raddi; Jerome L. Kligerman, both of Philadelphia, Pa.; Cal C. Herrmann, Bellevue, France

[73] Assignee: ESB Incorporated, Philadelphia, Pa.

[22] Filed: Feb. 23, 1971

[21] Appl. No.: 118,144

[52] U.S. Cl. ........................ 128/2.05 R, 128/419 P
[51] Int. Cl. ............................................. A61b 5/02
[58] Field of Search ................. 128/2.05 R, 2.05 T, 128/2.06 F, 2.06 R, 2.1 A, 2.1 R, 419 P, 419 R

[56] References Cited
UNITED STATES PATENTS

| | | | |
|---|---|---|---|
| 3,426,150 | 2/1969 | Tygart | 128/2.1 A |
| 2,492,617 | 12/1949 | Boland et al. | 128/2.06 F |
| 3,599,627 | 8/1971 | Millen | 128/419 P |
| 3,474,353 | 10/1969 | Keller, Jr. | 128/419 P |

OTHER PUBLICATIONS

Furman et al. "Medical Research Engineering," 3rd quarter, 1967, pp. 29-32.
Hagan et al. "American Journal of Medical Electronics," April-June, 1963, pp. 147-151.

Primary Examiner—William E. Kamm
Attorney—Robert H. Robinson, Anthony J. Rossi and Thomas A. Lennox

[57] ABSTRACT

A monitor apparatus is disclosed for monitoring electrical stimulation signals due to either natural or artificial electrical stimulation of a body part via a communication link such that the repetition rate of the electrical stimulation signals can be determined. The monitor apparatus comprises the subsystems: a transducer; a communication link or network; and a reciever. The transducer is adapted to sense the electrical stimulation signals generated either naturally or by an electronic organ stimulator, such as an implanted cardiac pacer, and to convert the electrical stimulation signals to audible signals such as tone bursts. These audible tone bursts are then transmitted over a communication link such as the standard telephone network to the receiver located at a remote telephone station, typically a cardiologist's office. The receiver is adapted to measure the time interval between received tone bursts. The receiver is further adapted to display or indicate to an observer the time interval between received tone burst. If desired, the receiver can be adapted to indicate directly the repetition rate of the stimulation signals. The information is then utilized by an observer for diagnostic purposes.

The monitor apparatus also includes a test means for testing the integrity of the apparatus including the transducer, the communication link and the receiver.

3 Claims, 4 Drawing Figures

INVENTORS.
WILLIAM J. RADDI
CAL C. HERRMANN
JEROME L. KLIGERMAN

MONITOR APPARATUS FOR IMPLANTED PULSE GENERATOR

BACKGROUND OF THE INVENTION

1. Field of the Invention:

This invention generally relates to apparatus for monitoring electrical stimulation signals due to either natural or artificial electrical stimulation of a body part via a communication link such that the repetition rate of the electrical stimulation signals can be determined. A first aspect of the invention relates to apparatus for monitoring from outside a living body and preferably from a remote location, a totally implanted electronic organ stimulator. More particularly, the first aspect of the invention concerns monitor apparatus which can be used to provide information or indicate to an observer, and/or record the state or condition of the power supply, generally comprising a battery, supplying electrical energy to an organ stimulator; such information or indication being derived from the rate of operation of the organ stimulator. A second aspect to the invention relates to a modification of the monitor apparatus to adapt it for the determination of cardiac pulse rate irrespective of pacer activity.

The invention will here be described in most detail in association with a battery powered electronic cardiac stimulator or "heart pacer" since the apparatus according to the invention has been particularly developed for use with a heart pacer. The apparatus, however, may be used in conjunction with other battery powered organ stimulators. It, may for example, be used in conjunction with stimulators for the brain, bladder and other organs as well.

2. Description of the Prior Art:

By way of background, it may be explained that electronic heart pacers are used in the treatment of heart block. Simply stated, heart block occurs when the natural periodic electric stimulation signals generated on a portion of the heart, the atrium, are for some reason partially or wholly blocked or prevented from reaching another portion of the heart, the ventricle. Because of the blockage, the ventricle does not function, at all if the block is complete, or pump at the proper time or at the proper rate if the block is partial.

Essentially, an electronic heart pacer is a device used to overcome or treat heat block. In recent times, the electronic pacers have been miniaturized and are now wholly implanted within the body, usually just below the level of the skin. Implanted pacers are usually self-contained and powered by battery. The pacers generate electric stimulation pulses which are then applied via a flexible lead or leads, to the heart. The generated electric pulses, i.e., artificial stimulation signals, when applied to the heart, simulate the natural periodic electric stimulation signals generated on the atrium and result in the ventricle pumping at the proper time and rate as in normal situations. Generally, the heart is electrically stimulated to beat once for each pulse that is generated by the pacer and received at the heart.

There are three broad categories into which most commercial pacers fall, namely, the synchronous types, the asynchronous types and the inhibited or standby types. The synchronous types are also sometimes referred to as "triggered" pacers in that their operation is effected by a signal derived from body activity which is sensed and fed back to the pacer to trigger its operation; the derived trigger signal usually being the presence of absence of either atrial or ventricular activity. The asynchronous types are also sometimes referred to as "non-triggered" in that they do not respond in any way to body activity; they operate at a fixed rate. The inhibited or standby types under normal cardiac activity do not produce stimulation pulses, however, if spontaneous rhythm is not sensed within a predetermined time interval, as for example, one second, then the pacer delivers a stimulating pulse, and continues to deliver pulses until normal rhythm is restored.

Most triggered pacers and most inhibited or standby pacers contain a magnetic switch which can be externally activated to convert the pacer to asynchronous or non-triggered operation.

As stated above, pacers are usually powered by batteries. The batteries best suited for powering pacers normally maintain a substantially constant voltage throughout their lives, and then, near the end of their lives run down over a relatively short period of time. Generally, toward the end of life of the batteries of a pacer operating, or caused to operate in a non-triggered mode, the pulse rate thereof decreases (the output pulse interval increases) and consequently, the heart beats slower. There is a type of pacer, however, in which the pulse rate increases with a decrease in battery voltage. In addition to changes in pulse rate due to battery exhaustion, a pacer's pulse rate may change due to physiological conditions or due to malfunction of the pacer.

It is, of course, important that changes in the pulse rate of a pacer, after implant, be detected at the earliest possible time in order that the cardiologist treating the patient may take appropriate measures to safeguard the life of the patient, as for example, he may consider that replacement of the pacer is called for when the pulse rate of the pacer falls to some predetermined rate below the rate determined or set at the time of implantation of the now failing pacer.

From the foregoing, it will be understood that an indication of the condition or state of the power supply or battery of a pacer operating, or caused to operate, in a non-triggered mode may be had by determining the time interval between two successive pulses of the pacer. Consequently, it has become desirable to provide an apparatus that would monitor the pulse rate of a pacer and as the pulse interval of the pacer changes, due to a defective battery, or the critical period of rapid decline in battery voltage near the end of its life, or for any other reason, to give an indication of such a change in pulse interval. Such an apparatus would provide the cardiologist with an effective means to monitor and ascertain the performance or condition of the battery or batteries of the pacer. Even more desirable would be apparatus that can be adapted to perform such functions from outside the body and from a remote location in order that it not be required that the patient make frequent trips to the office of the cardiologist.

Such apparatus has in fact been recently developed. See the abstract entitled Transtelephone Pacemaker Clinic by S. Furman, B. Parker and D. Escher, published in the American Journal of Cardiology, Volume 25, page 94. The abstract cited does not go into details of the apparatus used for the monitoring of a patient's implanted heart pacer via telephone lines, however, the apparatus used is known to the present inventors and comprises a transducer situated with the patient, usually in his home, and a receiver coupled to an electronic interval counter located at some central office, lab or hospital. Each pacer output pulse is detected or sensed by the transducer at the patient's hands and converted to an audible signal which is acoustically coupled to the patient's telephone handset for transmission to another telephone handset at the receiver location. The received audible signals are converted to short electrical pulses by the receiver and the receiver delivers these electrical output pulses to the electronic counter. The counter is adapted to provide a display of the time interval, in milliseconds, between received signals. The time interval between received signals provides an indication to an observer or personnel at the receiver location of the voltage state of the batteries of the pacer being monitored. More particularly, the time between received signals is compared to previously received or recorded data compiled over a period of time and the degree of change is then used as an indication of the state of the batteries of the pacer. The received data may, of course, be used for other diagnostic purposes.

The present invention is directed to apparatus similar to that described above and represents novel improvements thereto.

SUMMARY OF THE INVENTION

Briefly, and in accordance with the invention, an apparatus is provided for monitoring electrical stimulation signals due to either natural or artificial electrical stimulation of a body part via a communication link such that the repetition rate of the electrical stimulation signals can be determined. The apparatus includes first means adapted to sense the electrical stimulation signals and to convert the sensed electrical stimulation signals to transmittable signals for transmission over the communication link; second means to receive the signals transmitted over the communication link and to process the received signals for providing to an observer information indicative of the repetition rate of the electrical stimulation signals; and third means that is selectively activatable for testing or establishing the integrity of the monitor apparatus including the first means, the communication link and the second means.

DESCRIPTION OF THE PREFERRED EMBODIMENT

Figure 1:
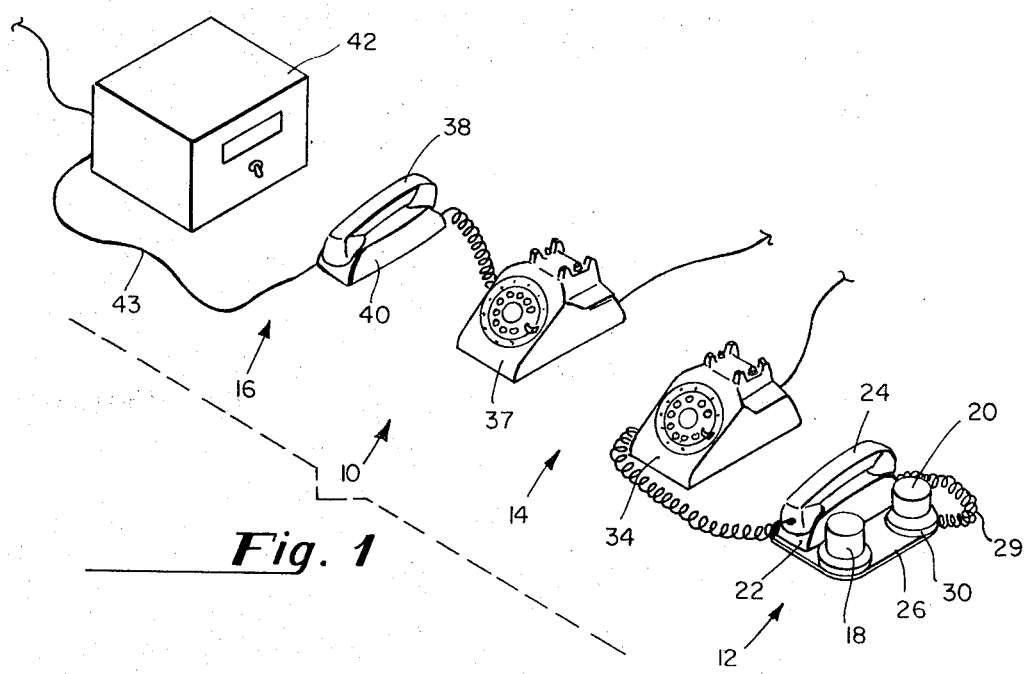
FIG. 1 is an over-all perspective view of the monitor apparatus in accordance with the invention.

Referring now to FIG. 1, a general description of the characteristics and use of the monitor apparatus, in accordance with the invention, will first be given in order to lay a foundation for the more detailed description to follow. It may be explained here, that the electrical output signals or stimulation pulses of an implanted cardiac pacer may be sensed by electrodes placed in contact with the body. The sensed signals will be coincident in time with the pacer pulses, i.e., the interval and pulse width or duration will be substantially the same, the level of the pulses will be, of course, lower and they may vary in shape. In FIG. 1, the monitor apparatus is designated generally by the reference numeral 10. Briefly, the monitor apparatus includes a transducer shown generally at 12 which is used to sense the electrical pulses generated by an implanted cardiac pacer (not shown) and convert these pulses to transmittable signals or audible tone bursts of predetermined duration for transmission over a standard telephone communication network, shown generally at 14. A receiver, shown generally at 16, which would typically be located at a remote telephone station such as a cardiologist's office, receives and measures the time interval between received signals and displays this information. The information that is displayed is the time interval, in milliseconds, between received signals which, of course, is an indication of the rate of the output pulses of the implanted pacer.

Accordingly, the complete monitor apparatus comprises the three subsystems; the transducer 12; the telephone communication network 14; and the receiver 16.

The transducer 12 comprises sensing means, such as the two metallic hand probes 18 and 20, which the patient grasps during measurements; an electronic circuit, to be described more fully below, which processes these signals; a cradle 22 which accepts a standard telephone handset 24, and which houses the electronic circuit; an audio speaker; and a battery to power the electronic circuit. Other components of the transducer will be more fully described hereinafter with reference to FIGS. 2 and 3.

The two hand probes are preferably shaped as hemispheres, as shown, of approximately 2.5 inches in diameter. Such a size comfortably fits into the palm of the average person's hand. The probe 18, hereinafter designated the low impedance probe, is permanently mounted on the transducer base plate 26. The low impedance probe 18 is mounted on the base plate for reciprocal vertical movement relative thereto. It is normally biased to its top most vertical position by a spring of a normally open power switch 28 (FIGS. 2 and 3) mounted within the probe. Downward pressure of approximately one-half pound is required to close the power switch 28 to activate the transducer 12. The downward pressure which is required to close the power switch 28, assures minimal contact resistance between the patient's hand and the probe surface without the use of paste or other preparations. The probe 20, hereinafter designated as the high impedance probe, is detachably mounted on the base plate 26, that is, it may be lifted off the base plate 26. The high impedance probe 20 is electrically connected to the circuit within the cradle 22 by means of a retractable coiled cord 29. It will, of course, be understood that the probes and their functions can be reversed. A receptacle 30 on the base plate 26 serves as a retainer for the probe 20 when it is not in use or when the transducer 12 is operating in the "test mode", to be described.

The high impedance probe 20 contains a discoid shaped ceramic magnet 32 (FIGS. 2 and 3) which will activate the reed switch contained in most non-fixed rate pacers when the patient places the probe 20 over the site of an implanted pacer. Placing the magnet over the site of such an implanted pacer will cause the pacer to revert to its non-triggered or fixed rate mode. Sufficient weight is contributed by the magnet 32 to the weight of the hand probe 20 so that together they weigh about one-half pound. The weight of the probe 20 assures that the patient will grasp the probe 20 securely when it is lifted from the receptacle 30 and this, in turn, assures minimum contact resistance between the hand of the patient and the probe surface.

When the high impedance probe 20 is resting in the receptacle 30, the self-contained magnet 32 activates a normally open reed switch 34 (FIGS. 2 and 3) and closes it. The reed switch 34 is physically mounted within the cradle 22. The reed switch 34, when closed, switches the transducer to the test mode, to be described.

The communication network, as depicted in FIG. 1, comprises the telephones 36 and 37 with their respective handsets 24 and 38. The communication network while shown as the standard telephone network, may, of course, comprise any known communication link.

The receiver 16 comprises the cradle 40 which is adapted to receive the handset 38 and an interval counter 42. The cradle 40 is electrically coupled to the counter 42 via cord 43. Housed within the cradle 40 is a telephone amplifier circuit which is magnetically coupled, via a pickup coil, to the earpiece contained in the handset 38 and which is also adapted to amplify the variations in current which drive the telephone earpiece. If desired, the telephone amplifier may be acoustically coupled to handset 38 via a microphone. Also contained in the cradle 40 is a monostable multivibrator circuit which is adapted to provide a short electrical pulse coincident with each received signal. The monostable multivibrator circuit may also be housed within the counter 42 enclosure, if desired. The output of the monostable multivibrator is utilized to drive the interval counter 42. The receiver 16, including the associated circuitry and interval counter 42, form no part per se of the present invention and may comprise standard off the shelf components. For this reason, detailed circuit diagrams of these components are not shown.

The use of the monitor apparatus shown in FIG. 1 is generally as follows: A telephone call is initiated by a clinician or operator to the patient. Upon answering the call the patient is instructed to place the telephone hand set 24 in the cradle 22 and to continuously push downwardly on the probe 18 for approximately 10 to 20 seconds after which time he is again to listen for further instructions. When the patient pushes down on the probe 18, the power switch 28 is closed which activates the transducer 12. Because the hand probe 20 is in the receptacle 30, the reed switch 34 is closed and the transducer 12 is in the test mode. The operator places the hand set 38 in the receiver cradle 40. In a manner to be described, a sequence of audible tone burst signals are transmitted over the telephone lines to the receiver at a 6Hz rate. At this rate, the time interval between successive tone bursts is approximately 167 milliseconds. The counter, as it is adapted to measure time interval in milliseconds should, during the test mode, indicate a number of approximately 167. If this reading is observed, then the integrity of the transducer, the communication link and the receiver is established. If this reading is not observed, then the operator will know that the monitor apparatus is not functioning properly and will attempt to remedy the problem, if possible. If the problem cannot be readily rectified, and the operator can communicate with the patient, the operator will inform the patient to visit the office of the cardiologist.

Assuming that the integrity of the monitor apparatus has been established, the operator proceeds to the next step which is to instruct the patient to return the handset 24 to the cradle 26 and then to grasp the low impedance probe 18 with his left hand to press downwardly thereon. The patient is also instructed to lift the high impedance probe 20 from the receptacle 30. If the patient has a triggered type or the inhibited or standby pacer, the patient is also instructed to place the probe 20 over the site of the implanted pacer. This latter action will cause the magnet 32 to activate the reed switch contained in the pacer and cause the pacer to revert to its fixed rate. Removal of the probe 20 from the receptacle 30 allows switch 34 to open and this takes the transducer 12 out of the test mode. A series of audible tone burst signals, at the pacer's fixed rate, are then transmitted to the receiver 16. The characteristics and the manner in which these audible tone burst signals are generated will be described more fully below. With the operator's handset 38 resting in the cradle 40, the transmitted signals will be coupled to the handset 38, and from there, they will be coupled to the interval counter 42 which displays the time interval, in milliseconds, between successive tone bursts. Typically, for pacers designed to deliver a fixed rate of 72 impulses per minute, the reading on the interval counter will be 833.33. Dividing this number into 60,000 or by the use of pre-printed tables, the operator can determine the output rate of the pacer in pulses per minute. It will be understood that, if desired, known circuitry is available to adapt the counter to provide a direct indication of the rate in pulses per minute. The operator records and compares the rate with previous data, informs the patient of the state of the pacer and arranges for the next telephone call to repeat the process.

Figure 4:
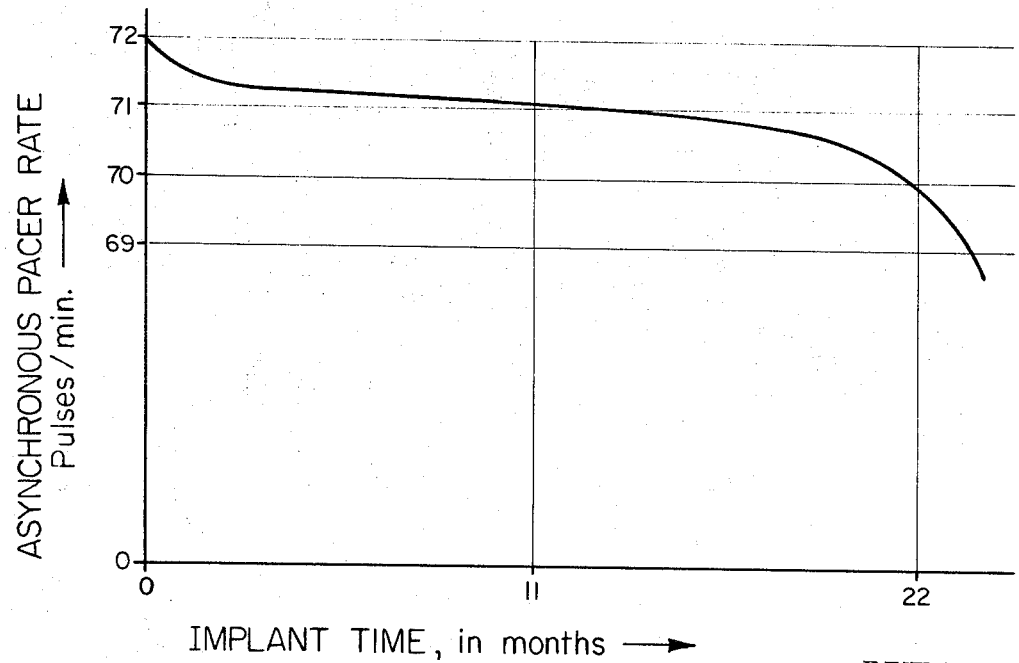
FIG. 4 is a diagrammatic graph useful to explain a function of the invention.

The above described monitoring process can be used to determine the state of the batteries of all implanted pacers that have a pulse rate that is variable as a function of battery voltage. The monitor apparatus is designed to provide an accurate and repeatable determination of rate to the nearest 0.01 pulse per minute. Such accuracy is desired because sudden real changes in rate by 1 to 2 pulses per minute are significant and can warn the cardiologist of impending pacer failure. By keeping accurate records of pacer rate and the rate of rate change, battery exhaustion can be detected when it begins or soon thereafter. It is important to determine the beginning of battery exhaustion as soon as possible in that the rates of change can be quite rapid with a change from a substantially normal rate to a substantially abnormal rate within a months time or less. FIG. 4 is a diagrammatic graph illustrating asynchronous pacer rate in pulses per minute against implant time in months.

Figure 2:
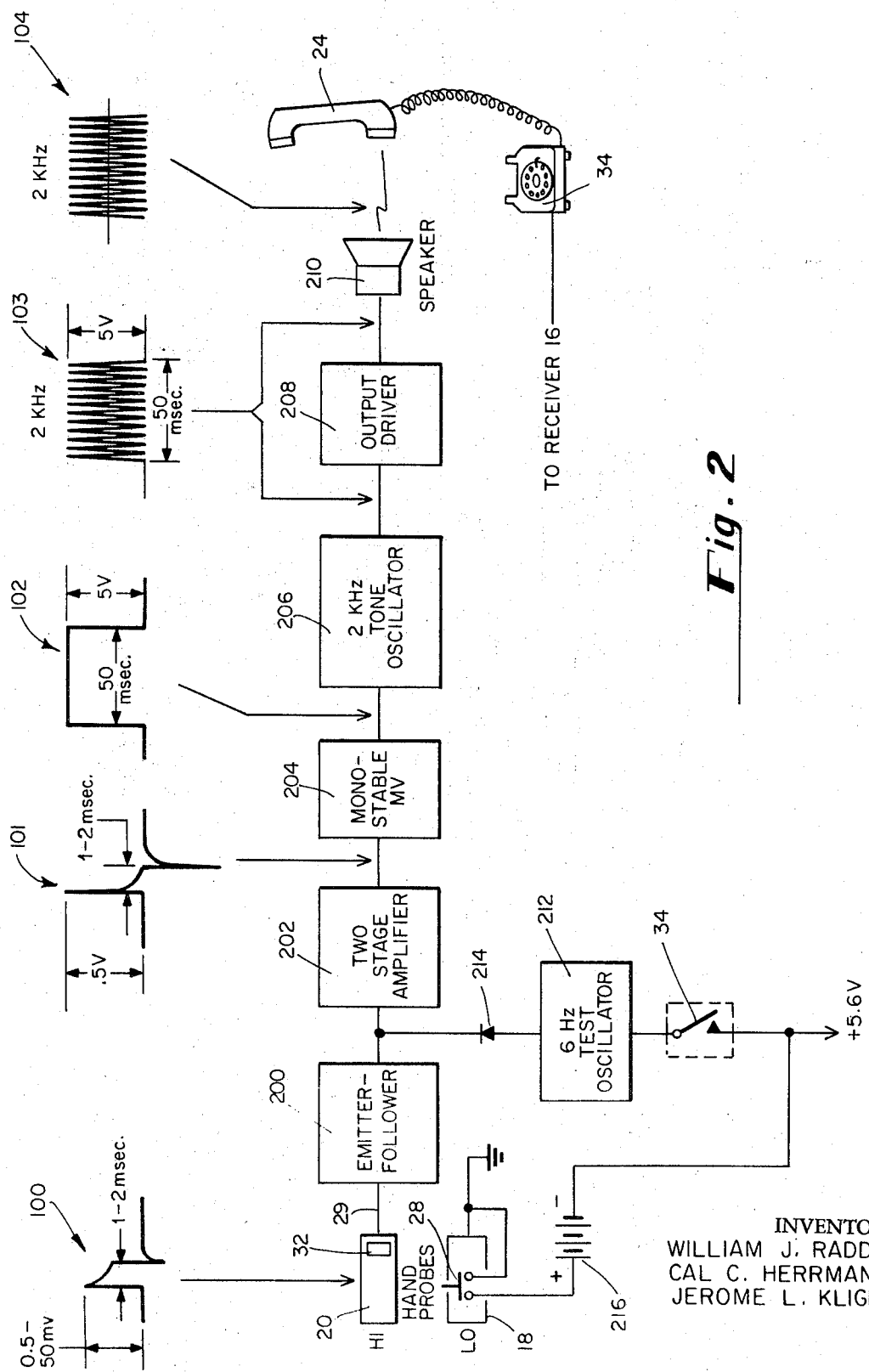
FIG. 2 is a block diagram of the transducer means of the monitor apparatus including diagrammatic wave forms that are useful to explain the invention.

Having generally described the characteristics and use of the monitor apparatus, a more detailed description of the transducer 12 will now be given with reference to FIGS. 2 and 3. In FIG. 2, a block diagram of the transducer circuitry is shown. Also, illustrated in FIG. 2 are diagrammatic waveforms of the inputs and outputs of the various components of the transducer 12. Signals 100 from an implanted pacer are sensed by the hand probes 18 and 20, as described. Typically, these signals are from between about 0.5 millivolts to about 50 millivolts in amplitude with a 1 to 2 millisecond duration. The sensed signals are fed into an emitter follower amplification stage 200 which has a high input impedance, low output impedance and unity gain. The high input impedance of stage 200, approximately 10K - 50K ohms, is required because of the high input impedance which can occur between the hand probes 18, 20, and the patient's hands. The output impedance of a patient as measured between his hands, using the hand probes is typically 500 to 1000 ohms, however, it can elevate to tens of thousands of ohms depending upon environmental and physiological variations.

The output of the emitter follower 200 is coupled to a variable gain two stage amplifier 202 which raises the level of the input signals to approximately 0.4 to 0.6 volts. This is represented by waveform 101 in FIG. 2. This voltage is the trigger sensitivity of the next stage comprising a monostable multivibrator 204. This latter stage stretches or lengthens the amplified sensed pulses of approximately one millisecond to 50 milliseconds as is depicted by the waveforms 102 in FIG. 2. The output of the monostable multivibrator 204 gates on the next stage of the transducer 12 which comprises a 2KHz tone burst oscillator 206 for the duration of the 50 millisecond output pulse interval of the multivibrator 204, thus effecting a series of 50 millisecond electrical tone burst signals. This is represented by the waveform 103 in FIG. 2.

The 50 millisecond electrical tone burst signals are each amplified by an output driver stage 208 which is in turn coupled to an audio permanent magnet (PM) speaker 210 which generates an audible 2KHz tone burst signal at the pulse rate of the patient's pacer such that the leading edge of each audible tone burst signal is coincident with the leading or trailing edge of each sensed pacer pulse. The audible signals are represented in FIG. 2 by the waveform 104. These audible tone burst signals are coupled to the handset 24 for transmission to the receiver 16 as described above.

It can thus be seen that the monostable multivibrator 204 and the 2KHz tone burst oscillator 206 comprises a "signal producing means" that is responsive to sensed electrical pulses to produce an electrical tone burst signal in correspondence with the occurrence of each electrical pulse or electrical signal sensed by the hand probes 18 and 20. The output from the monostable multivibrator 204, if desired, may be coupled directly to the output driver stage 208 and rather than producing an audible 2KHz tone burst signal an audible signal will be produced that can be compared to a click which is approximately 50 msec. in duration. Accordingly, while the monostable multivibrator 204 and the 2KHz tone burst oscillator 206 together have been characterized above as comprising a "signal producing means", the monostable multivibrator 204 above, or an equivalent thereof, may be considered the "signal producing means" as this term is used hereinafter in the claims of this disclosure. It will also be understood from the foregoing, that output driver stage 208 and the speaker 210, or the speaker alone comprise "output means" which produce an audible tone burst signal in correspondence with the occurrence of each electrical tone burst signal applied thereto.

Also shown in the block diagram of FIG. 2 is a 6Hz test oscillator 212 which is activated by the reed switch 34 which, as stated above, is physically located in the cradle 22 and adjacent the high impedance probe 20 when the high impedance probe is in the receptacle 30. When the high impedance probe 20 is located in the receptacle 30, the magnet contained therein causes the reed switch 34 to close thus activating the 6Hz oscillator 212. The output of the oscillator 212 is coupled to the input of the two stage amplifier 202 via a diode 214. When the 6Hz oscillator is "off", the diode 214 is reversed biased and signals from the emitter follower 200 pass unattenuated to the two stage amplifier 202. When the 6Hz oscillator is "on", however, the emitter follower 200 is disabled, in a manner to be described, and this prevents signals from the patient from reaching the two stage amplifier 202. Accordingly, only signals from the 6Hz oscillator 212 are fed to the amplifier 202 for ultimate transmission to the receiver 16. Therefore, when the power switch 28 is depressed and with the high impedance probe 20 being in its receptacle 30, a series of 50 millisecond audible tone burst signals are generated by the speaker 210 at a 6Hz rate. As stated above, the purpose of the test oscillator is to verify the electrical integrity of the complete system including the transducer 12, the communication link 14, and the receiver 16.

The electronic circuit of the transducer 12 is preferably powered by a 4 or 5 cell, 1 amphere hour, HgO-Zn battery 216, which under normal use will provide operation for an expected 2 years. Battery operation has been chosen to give the transducer 12 complete portability for use at any location where a standard telephone is present, including a telephone booth.

Figure 3:
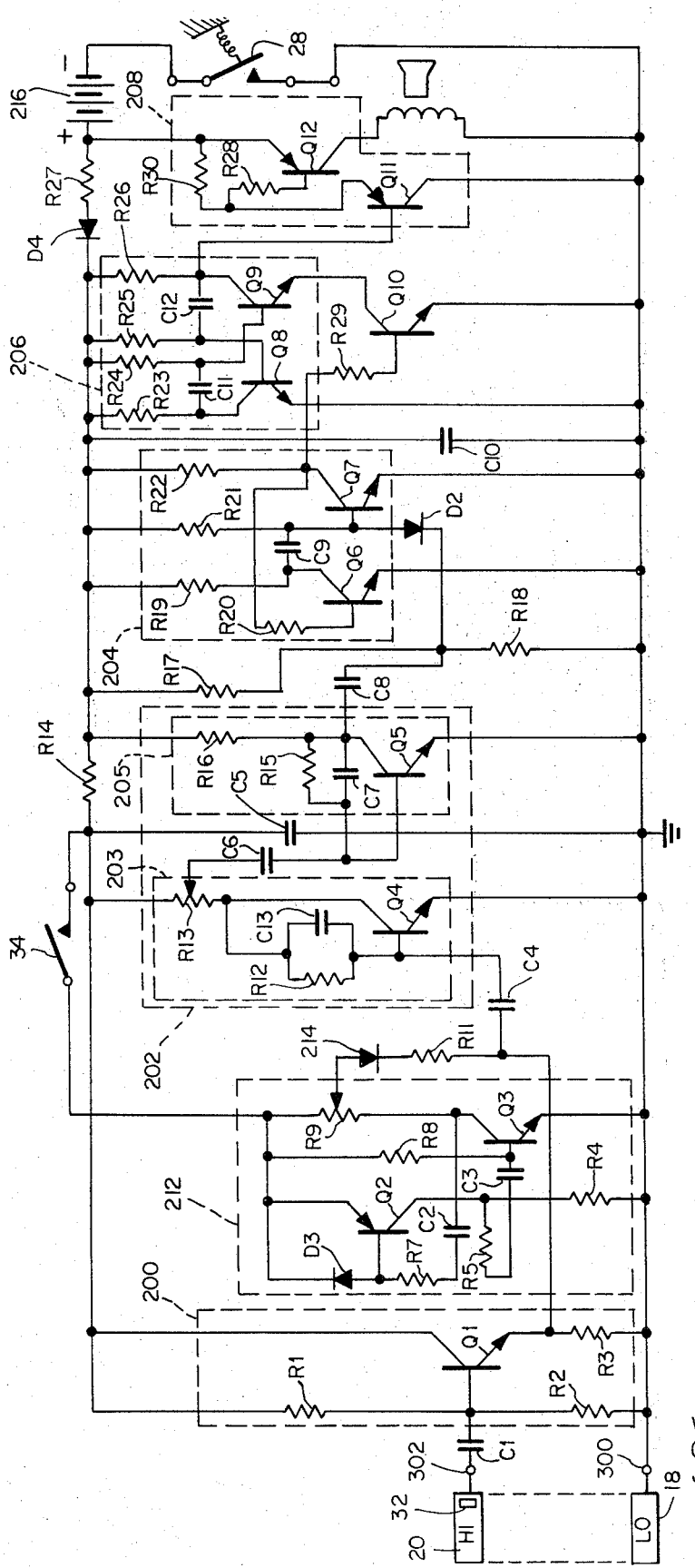
FIG. 3 is a circuit diagram of the transducer means of the monitor apparatus.

A more detailed schematic of the transducer 12 is shown in FIG. 3. Referring now to FIG. 3, the hand probes 18 and 20 are connected to the terminals 300 and 302, respectively. Pacer signals sensed at the probes are coupled to the emitter follower stage 200 comprising the transistor Q1, resistors R1, R2, and R3, through capacitor C1. Stage 200 has an input impedance of approximately 50K ohms, and output impedance of approximately 2.5K ohms, and unity gain. Resistors R1, and R2 bias the base transistor Q1 to approximately 2.2 volts, the DC emitter potential of transistor Q1 is therefore, approximately 1.6 volts.

The output from transistor Q1 is coupled via capacitor C4 to the two stage amplifier 202. The two stage amplifier stage 202 has two portions. The first portion comprises a common emitter amplifier 203 consisting of a transistor Q4, resistors R12 and R13, and a capacitor C13. The voltage gain of the amplifier 203 depends upon the position of the potentimeter resistor R13. The maximum gain of this portion of the two stage amplifier 202 is 40. The output of transistor Q4 is coupled via a capacitor C6 to the second portion of the two stage amplifier 202 which comprises an identical amplifier stage 205 having a fixed maximum gain and comprising a transistor Q5, resistors R15 and R16 and a capacitor C7. The two identical stages of amplification have a combined maximum voltage gain of approximately 1600 and a band width of 2KHz to 6KHz. The gain of the two stage amplifier 202 is preferably adjusted to provide a sensitivity of 0.5 millivolts which represent the weakest signal to be expected at the hand probes 18 and 20. Further increase in gain is discouraged since it would cause the transducer 12 to be overly susceptible to ambient electrical interferences. Coupling capacitors C4 and C6 determine the low frequency roll-off whereas capacitors C13 and C7 determine high frequency roll-off. A band width of 2KHz to 6KHz has been selected to filter out 60Hz interference and its immediate harmonics; to differentiate the 1 – 2 millisecond square waves thus detecting only the leading and trailing edges of the pacer pulse; and, to filter out high frequency interference.

The output from transistor Q5 is coupled to the monostable multivibrator 204 via capacitor C8 and diode D2. The monostable multivibrator 204 comprises transistors Q6 and Q7, resistors R19, R20, R21 and R22, and capacitor C9. The output pulse duration of the multivibrator, approximately 50 milliseconds, is determined by resistor R21 and capacitor C9. Resistors R17 and R18 provide a bias voltage for diode D2 which establishes the trigger sensitivity of the monostable multivibrator 204 at 0.35 to 0.4 volts negative going signal. When the monostable multivibrator 204 switches from the stable to the astable state, transistor Q7 turns off. This action causes transistor Q10 to saturate since the transistor Q7 is coupled to the base of transistor Q10 via resistor R29. When transistor Q10 saturates (switches on), it enables the 2KHz tone burst oscillator 206. The tone burst oscillator 206 consists of an astable multivibrator which comprises transistors Q8 and Q9, resistors R23, R24, R25 and R26, capacitors C11 and C12.

The monostable multivibrator 204 will trigger on negative going signals only, therefore, if the sensed pacer signal is positive (high impedance probe 20 to low impedance probe) the monostable multivibrator 204 will trigger on the trailing edge of the sensed signal. If the pacer signal is negative going, the monostable multivibrator will trigger on the leading edge of the sensed signal. Either polarity will provide sufficient accuracy to measure the pulse interval to 0.2 milliseconds.

The output from the astable multivibrator 206 is coupled to the 45 ohm PM speaker via the output driver 208 consisting of transistors Q11 and Q12 and resistors R28 and R30. The driver circuit 208 switches the speaker across the battery 216 at the 2KHz rate. Thus, a 2KHz tone burst of 50 millisecond duration is produced when a 0.5 millivolt or greater signal is picked up or sensed at the hand probes 18 and 20.

The audio sound level of the speaker 210 is preferably adjusted, by choice of speaker and acoustic coupling to the telephone handset 24, to produce a —9dbm average signal on the telephone lines when the transducer is in the test mode. This is the maximum sound level recommended by the commercial telephone companies.

The test oscillator 212 which, as stated, is used to check the operation of the monitor apparatus and telephone line on which signals are being transmitted comprises the components: transistors Q2 and Q3, resistors R4 and R5, diode D3 and resistors R7, R8, R9 and R10, and capacitors C2 and C3. The test oscillator 212 produces a 6Hz, 1 millisecond pulse when the reed relay 34 is closed. This occurs when ever the hand probe 20 is in the receptacle 30 and the magnet 32 effects the closing of the reed switch 34. Output from this oscillator (slider of potentimeter R9) is coupled through diode 214 and resistor R11 to the emitter of transistor Q1.

The quiescent DC voltage at the emitter of transistor Q1 is typically about 1.6 volts DC. When reed switch 34 closes, the slides of resistor R9 retain a DC voltage of about 4.5 to 5 volts depending upon the adjustment of resistor R9. This causes the emitter base junction of transistor Q1 to reverse bias by approximately 1 to 2 volts. Consequently, signals from the hand probes 18 and 20, cannot propagate beyond the base of transistor Q1. When the transducer is not in the test mode, diode 214 is reversed biased. When the test oscillator 212 has been activated by the closure of reed switch 34, a 6Hz pulse signal is fed to the base of transistor Q4 from the slides of resistor R9 via diode 214, resistor R11, and capacitor C4. Operation of the circuit of FIG. 3 in the test mode beyond transistor Q4 is the same as that described above relative to the stages 202, 204, 206, 208 and 210. That is, the output signals or electrical test signals or pulses of the test oscillator 212 are amplified by the two stage amplifier 202; the electrical test signals or pulses are then coupled to the "signal sensing means", i.e., the monostable multivibrator 204 and the 2KHz tone burst oscillator; the signal producing means are responsive to the electrical test pulses to produce an electrical test tone burst signal in correspondence with the occurrence of each applied electrical test pulse; and the "output means" i.e., the output driver 208 and/or speaker 210, produces an audible test tone burst signal in correspondence with the occurrence of each electrical test tone burst signal when the latter signals are applied thereto.

The remaining components in the circuit shown in FIG. 3 and their functions are as follows. Resistor R27, capacitor C10, and resistor R19, and capacitor C5 are decouplers to prevent the high speaker current from reaching the sensitive input amplifier. Diode D4 causes the output circuit to instantaneously decrease to 0 volts when the power switch 28 is turned off. Otherwise the speaker would continue to generate tone bursts for a short period of time after the power is off and until capacitor C10 discharges.

In a particular embodiment of this invention, the components of the described transducer 12 can have the following values:

| Resistors (ohms) | |
|---|---|
| R1, R2, R4, R19, R20, R22, R29, R30 | 100K |
| R3 | 4.7K |
| R5, R11 | 1K |
| R7, R18 | 47K |
| R8, R17 | 680K |
| R12, R15 | 270K |
| R14, R27 | 100K |
| R16 | 10K |
| R21 | 470K |
| R23, R26 | 22K |
| R24, R25 | 360K |
| R28 | 470K |
| Potentiometer R9 | 5K |
| Potentiometer R13 | 10K |
| | |
| Capacitors (micro farads) | |
| C1, C8 | 0.01 |
| C2 | 0.0047 |
| C3 | 0.47 |
| C6 | 0.05 |
| C5 | 70 |
| C9 | 0.1 |
| C10 | 400 |
| C11, C12 | 0.001 |
| Capacitors (pico farads) | |
| C7, C13 | 200 |
| | |
| Diodes | |
| D1, D2, D3, D4 | EDAL-B5A5 |
| | |
| Transistors | |
| Q2, Q11, Q12 | 2N5447 |
| Q1, Q3, Q4, Q5, Q6, Q7, Q8, Q9, Q10 | 2N5449 |

The monitor apparatus described thus far is not limited to the determination of the repetition rate of artificial stimulation signals as generated by a pacer. By proper modification of the amplifier portions of the transducer 12, namely, the two stage amplifier 202, the natural cardiac pulse rate, irrespective of pacer activity, can be determined. To this end, the frequency response of the transducer must be modified and this can be effected by reducing the amplifier pass band from 2KHz–6KHz to 10Hz–100Hz (i.e., adjustment of the capacitors C4, C6, C13 and C5) which is the frequency range of the electrical R-wave produced by the heart, the R-wave being the largest component of the QRS complex. These natural stimulation signals can also be sensed between the patient's hands but are generally of reduced amplitude as compared to artificial pacer stimulation signals. Typically, they fall in the range of about 0.1 to 1 mv. Therefore, increased amplifier gain may be required over that obtainable by the circuit shown in FIG. 3. An additional transistor amplifier stage similar to the stage comprising components C6, C7, R15, R16 and Q5 will provide sufficient additional amplification to trigger the 50 msec. monostable multivibrator 204 each time an R-wave is sensed by the probes 18 and 20. In this manner, the interval time between heart beats can be determined and displayed by essentially the same apparatus heretofore described to determine pacer pulse interval. The transition between pacer pulse interval monitoring and heart beat-interval monitoring can easily be achieved by incorporating into the transducer 12 a multipole switch which would change the values of the pertinent frequency determining components and therefore the amplifier pass band. When the incorporated switch is in the "pacer" mode, only those signals in the frequency range of 2KHz to 6KHz will be amplified and, therefore, the transducer 12 will be sensitive only to pacer stimulation signals and be insensitive to natural cardiac R-wave signals. When the switch is in the "heart beat" mode position, by similar reasoning, the transducer 12 will respond only to cardiac R-waves.

It will be obvious to those skilled in the art that the monitor apparatus, while designed and described for the "remote" monitoring of either natural or artificial stimulation signals, can be used for these purposes in a single room or location, as for example, a clinic building. In such an instance, the communication link may comprise any means capable of transmitting the information as sensed and processed by the transducer 12 to the receiver 16. It will be further understood, that the output or transmitted signals of the transducer need not be audible signals, but may comprise electrical signals with appropriate modification of the monitor apparatus both at the transducer output end and at the input end of the receiver. Accordingly, the use of the term "transducer" is not to be construed as limiting the monitor apparatus and specifically that portion of the monitor apparatus designated as the transducer 12, to a device which converts the sensed electrical stimulation signals to audible transmittable signals. Both the input to and the output from the transducer 12 may be electrical signals, and the input to the receiver 12 may be either audible or electrical signals.

Having thus described our invention, we claim.

1. A transducer for the monitoring of a body implanted electric pulse generating device via a telephone communication link, wherein the pulse generating device includes:

a power supply, and a pulse generating circuit operatively connected to the power supply to translate the power supplied by the power supply into a sequence of electrical pulses, the electrical pulses produced by the pulse producing circuit being of a preselected duration and being produced at a preselected rate, comprising:

a. sensing means constructed and arranged for connection to the body for sensing the electrical pulses generated by the implanted pulse generating device;

b. signal producing means operatively connected to the sensing means and being responsive to sensed electrical pulses to produce an electrical tone burst signal of predetermined duration in correspondence with the occurrence of each sensed electrical pulse;

c. output means operatively connected to the signal producing means for producing an audible tone burst signal of predetermined duration in correspondence with the occurrence of each electrical tone burst signal applied thereto; and d. test means operatively connected between the sensing means and signal producing means and including means operable for rendering the transducer insensitive to electrical stimulation signals and for activating the test means, the test means further comprising an electrical test pulse producing circuit which applies to the signal producing means electrical test pulses at a predetermined rate, the predetermined rate of the electrical test pulses being greater than the expected rate of the electrical pulses generated by the pulse generating device, the signal producing means being also responsive to the electrical test pulses to produce an electrical test tone burst signal of predetermined duration in correspondence with the occurrence of each of the applied electrical test pulses, and the output means also producing an audible test tone burst signal of predetermined duration in correspondence with the occurrence of each electrical test tone burst signal when the latter signals are applied thereto.

2. Apparatus for the remote monitoring of a body implanted electric pulse generating device via a telephone communication link, wherein the pulse generating device includes:

a power supply, and a pulse generating circuit operatively connected to the power supply to translate the power supplied by the power supply into a sequence of electrical pulses, the apparatus comprising:

a. transducer means adapted for coupling with the implanted pulse generating device to sense electrical pulses generated by the pulse generating device and to convert the sensed electrical pulses to audible pulse signals of predetermined duration for transmission over the telephone communication link, the transducer means comprising:

1. sensing means for sensing the electrical pulses generated by the pulse generating device;

2. signal producing means operatively connected to the sensing means and being responsive to sensed electrical pulses to produce an electrical tone burst signal of predetermined duration in correspondence with the occurrence of each sensed electrical pulse; and 3. output means operatively connected to the signal producing means and being adapted to be acoustically coupled to the telephone communication link, the output means producing an audible tone burst signal of predetermined duration in correspondence with the occurrence of each electrical tone burst signal applied thereto;

b. receiver means to receive the audible signals transmitted over the communication link and to process the received audible signals so as to provide to an observer information indicative of the pulse repetition rate of the pulse generating device; and c. test means operatively connected to the transducer means for testing the integrity of the apparatus including the transducer, the communication link and the receiver, test means being operatively connected between the sensing means and signal producing means and including means operable for rendering the transducer insensitive to electrical stimulation signals and for activating the test means, the test means further comprising an electrical test signal producing circuit which applies to the signal producing means electrical test signals at a predetermined rate, the predetermined rate of the electrical test signals being greater than the expected rate of the electrical stimulation signals, the signal producing means being also responsive to the electrical test signals to produce a transmittable signal of predetermined duration in correspondence with the occurrence of each of the applied electrical test signals.

3. Apparatus for the remote monitoring of a body implanted electric pulse generating device via a telephone communication link, wherein the pulse generating device includes:

a power supply, and a pulse generating circuit operatively connected to the power supply to translate the power supplied by the power supply into a sequence of electrical pulses, comprising:

a. transducer means adapted for coupling with the implanted pulse generating device to sense electrical pulses generated by the pulse generating device and to convert the sensed electrical pulses to audible pulse signals of predetermined duration for transmission over the telephone communication link, the transducer means comprising:

1. sensing means for sensing the electrical pulses generated by the pulse generating device;

2. signal producing means operatively connected to the sensing means and being responsive to sensed electrical pulses to produce an electrical tone burst signal of predetermined duration in correspondence with the occurrence of each sensed electrical pulse; and 3. output means operatively connected to the signal producing means and being adapted to be acoustically coupled to the telephone communication link, the output means producing an audible tone burst signal of predetermined duration in correspondence with the occurrence of ech electrical tone burst signal applied thereto;

b. receiver means to receive the audible signals transmitted over the communication link and to measure and display the time interval between received audible signals for indicating to an observer the time interval between each audible signal; and c. test means operatively connected to the transducer means for testing the integrity of the apparatus including the transducer, the communication link and the receiver, the test means being operatively connected between the sensing means and signal producing means and including means operable for rendering the transducer insensitive to electrical stimulation signals and for activating the test means, the test means further comprising an electrical test pulse producing circuit which applies to the signal producing means electrical test pulses at a predetermined rate, the predetermined rate of the electrical test pulses being greater than the expected rate of the electrical pulses generated by the pulse generating device, the signal producing means being also responsive to the electrical test pulses to produce an electrical test tone burst signal of predetermined duration in correspondence with the occurrence of each of the applied electrical test pulses, and the output means also producing an audible test tone burst signal of predetermined duration in correspondence with the occurrence of each electrical test tone burst signal when the latter signals are applied thereto.

* * * * *